June 24, 1930.    A. L. BRIDGHAM    1,766,703
VALVE
Filed Aug. 31, 1926    2 Sheets-Sheet 1

INVENTOR:
Arthur L. Bridgham
By Craig Hays
ATTORNEYS:

June 24, 1930.  A. L. BRIDGHAM  1,766,703
VALVE
Filed Aug. 31, 1926  2 Sheets-Sheet 2
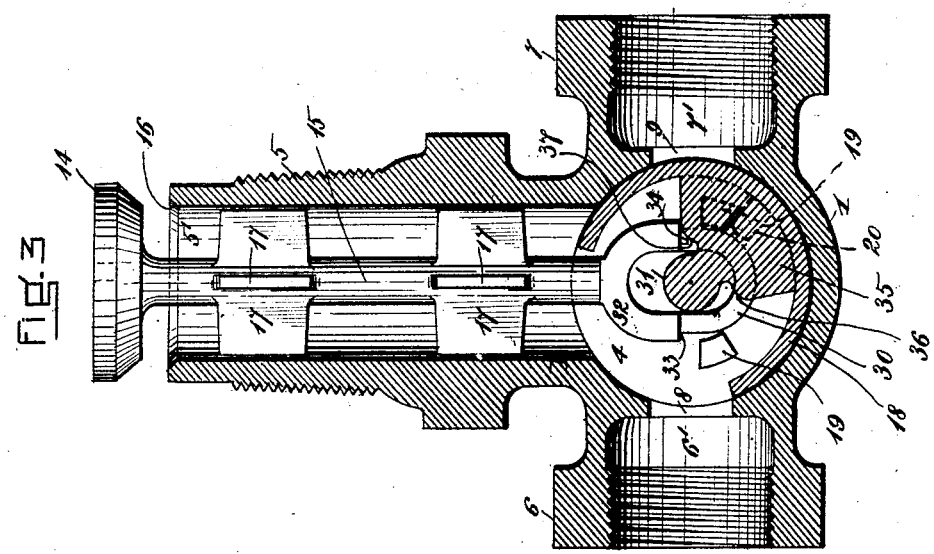
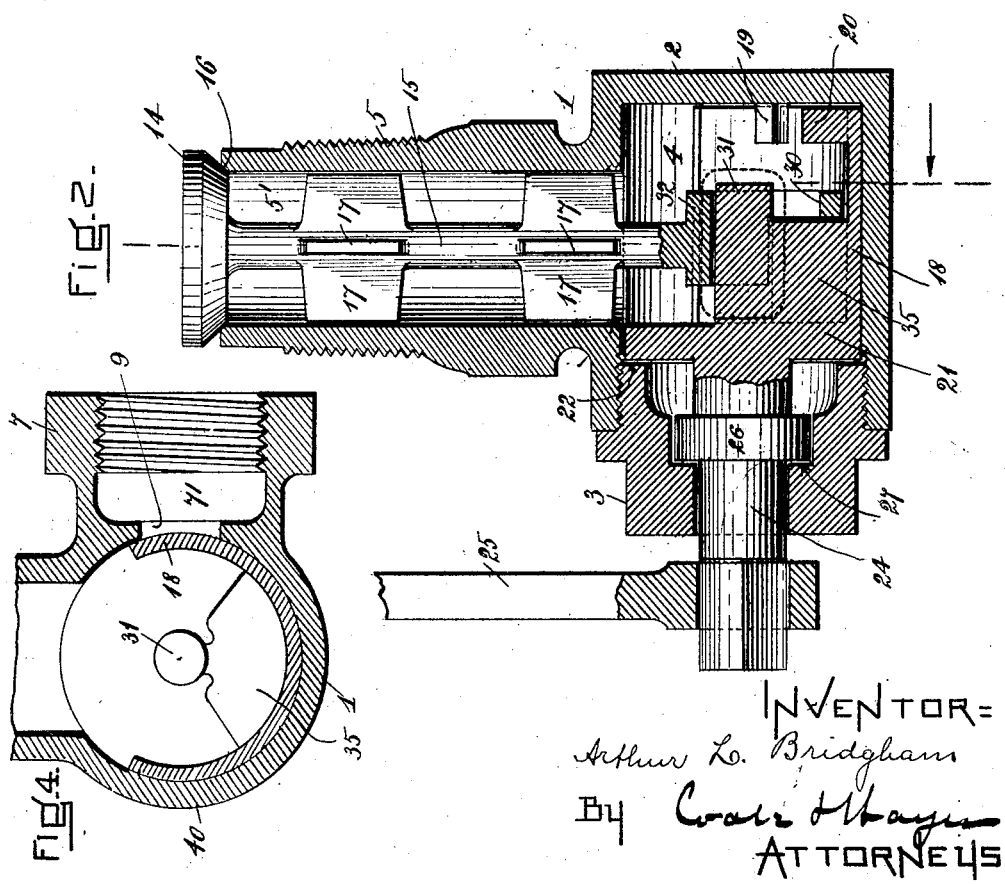
INVENTOR=
Arthur L. Bridgham
By
ATTORNEYS Patented June 24, 1930

1,766,703

UNITED STATES PATENT OFFICE

ARTHUR L. BRIDGHAM, OF BOSTON, MASSACHUSETTS, ASSIGNOR OF ONE-HALF TO CHARLES H. SHERBURNE, OF BOSTON, MASSACHUSETTS

VALVE

Application filed August 31, 1926. Serial No. 132,809.

Among the objects of the invention are the following:

To provide a valve especially adapted for controlling the passage of fluid under high pressure;

To provide a valve having relatively few parts;

To provide a valve requiring no stuffing boxes or packing;

To provide a valvular construction admitting of either a two or three-way valve;

To control the pressure by separate valves, one controlling the inlet and the other the outlet or outlets;

To provide a unitary manual control for both valves and especially a construction in which the inlet valve is controlled by a direct manual control of the outlet valve;

To provide a valve in which access may be had to its interior parts without removing the valve from the fixture or fixtures to which it may be connected; and especially To provide a valve adaptable for conditions of hard usage, that will stand the strain however the valve may be used and will last for a long time with little danger of breakage and no wear such as will impair its utility.

The improved valve can best be seen and understood by reference to the drawings, in which—

Fig. 2 is a longitudinal vertical section of the valve, certain parts being shown in side elevation.

Fig. 3 is a cross vertical section of the valve with certain parts shown in side elevation and shows especially a changed position of certain of its parts over what is shown in Figs. 1 and 2; and Fig. 4 is a cross vertical section of a detail of construction to which reference will later be made.

Figure 1:
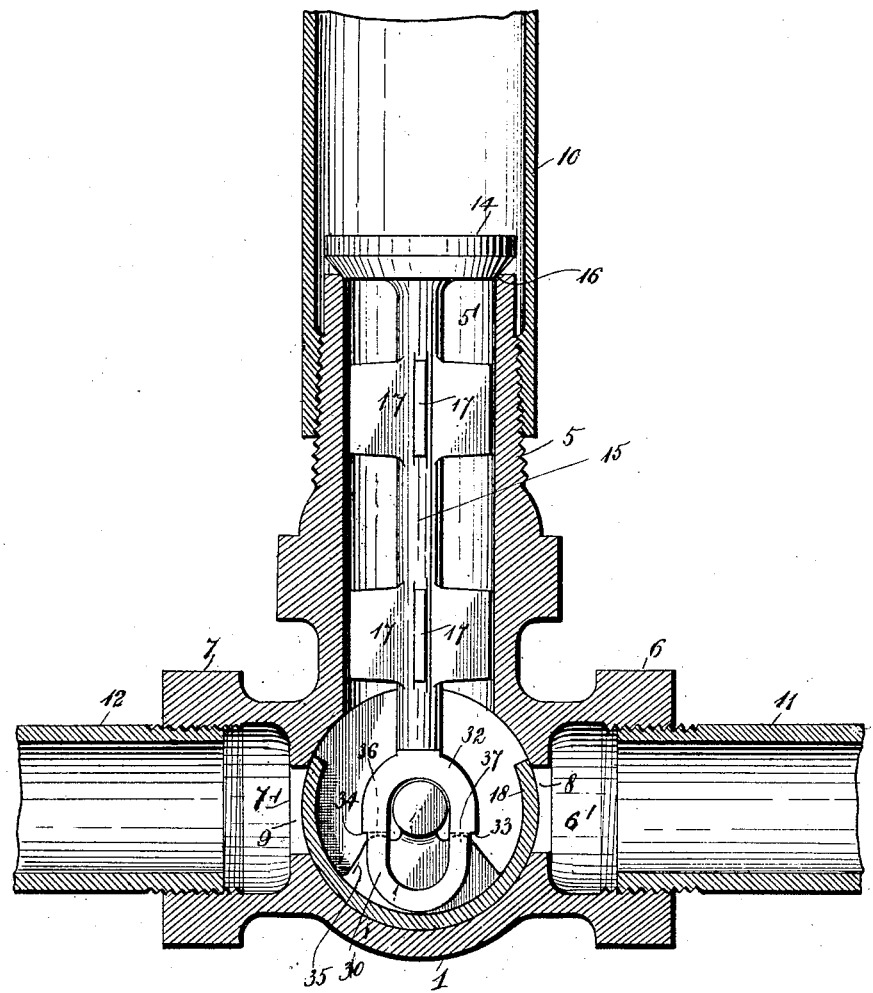
Fig. 1 is a cross vertical section of the valve, certain parts thereof being shown in side elevation.

Referring to the drawings, 1 represents the body of the valve having a closed end 2, and fitted on its opposite end with a detachable bonnet 3, all co-operating to form within the body a generally cylindrical chamber 4. The body has an inlet body extension 5 with inlet passage $5^1$ through it leading directly into the chamber 4 of the valve body. The valve has also outlet body extensions 6 and 7, with outlet passages $6^1$ and $7^1$ through them, respectively, leading from the chamber 4 of the valve body by way of ports 8 and 9, respectively, with which the valve body is provided. The outlet body extensions 6 and 7 are arranged on opposite sides of the valve body in line with one another and the inlet body extension 5 is arranged at substantially right angles to the line of the outlet extensions. Both the inlet extension and the outlet extensions are threaded to receive pipe extensions therefrom, the inlet to receive a pipe extension 10, and the outlets to receive pipe extensions 11 and 12, respectively. The entire valve body with its inlet and outlet extensions apart from the bonnet is preferably formed of one integral piece or casting.

The entrance to the inlet passage $5^1$ is controlled by a valve 14, 15 representing the stem of this valve. The valve is arranged beyond the end of the inlet body extension 5 and closes against a seat 16 at the outer end of this extension, the valve closing in the direction in which the fluid is moving as it enters the inlet passage and passes into and through the chamber 4 of the valve body. The stem 15 of the valve is provided with fins 17 which extend outwardly to have sliding contact with the internal surface of the inlet body extension 5. By the fins the inlet valve and its stem are centered and the valve guided as it is moved onto and off its seat.

The ports 8 and 9 leading to the respective outlet passages from the chamber 4 of the valve body are controlled by a rotary valve 18. This valve comprises a shell of arc-like curvature, in fact having the curvature of the cylindrical chamber 4 of the valve body within which it turns. The valve is of such size that it will close both of the ports 8 and 9 when the valve is in its normal position, as shown in Fig. 1. From this position it may be turned to open one or the other of the ports 8 or 9, depending upon the direction of turning, but leaving at all times, whatever the permitted turned position of the valve may be, a free opening from the inlet passage 5¹ into the chamber 4 of the valve body. The valve has only such permitted degree of turning as will insure opening of one or the other of the ports 8 or 9. To this end the end 2 of the valve body is provided with stops 19, 19, and the valve is provided on its outer end with a raised finger 20 adapted to engage one or the other of these stops as the valve is turned in reverse directions. The valve 18 is mounted for turning upon a circular disk or head 21 arranged to turn within the end of the chamber 4 of the valve body against which it has bearing just adjacent the inner end 22 of the bonnet 3. Extending from the disk or head 21 is a valve stem 24 which extends outwardly through the bonnet to turn therein. The outer end of the stem projecting beyond the bonnet is fitted to receive a handle 25 by which the stem and valve with it are turned. The joint between the valve stem 24 and the bonnet is sealed against passage of fluid by means of a collar 26 on the stem which bears against an annular edge 27 formed within the bonnet. When pressure is admitted to the chamber 4 of the valve body from the inlet passage it will act upon the disk or head 21 forming a piston, and force this head and valve stem with it outwardly so that the collar 26 on the stem will be pressed with great force against the annular edge 27 in the bonnet, thus forming a fluid tight joint. The arrangement of the collar 26 is also such that when it is bearing against the edge 27, the disk or head 21 will be held just out of contact with the inner end 22 of the bonnet. The disk or head 21 might have bearing against the inner end of the bonnet for sealing the joint between the chamber 4 of the valve body and the atmosphere, but owing to the relatively large size of the head and the high pressure with which it might be held against the inner end of the bonnet the arrangement would tend to offer such resistance as would prevent an easy turning of the valve. Inasmuch as the collar 26 is a relatively small collar the frictional contact of its bearing against the edge 27 within the bonnet, however hard the collar is held, will not interfere materially with a free turning of the valve.

According to the operation of the valve the inlet valve 14 is opened simultaneously with the opening of the outlet valve 18. To this end the stem 15 of the outlet valve is provided at its lower end within the chamber 4 of the valve body with a yoke 30 of generally elliptical form. Extending axially from the centre of the disk or head 21 is a stud 31 which passes through the yoke. The yoke fits rather snugly around this stud and the stud operates to hold the stem 15 and the outlet valve 14 carried by it from turning but permits a reciprocatory movement of the valve for opening or closing. The stud limits, however, the opening of the valve for when the valve has been moved to a full open position the lower end of the yoke will draw against the stud preventing further opening of the valve. The upper portion 32 of the yoke or that portion which immediately joins the stem 15 is thickened to present on the under opposite sides thereof separate spaced edges 33 and 34, respectively. Fixed to the valve 18 and head 21 and preferably by integral connection therewith, is a cam 35 having shoulders 36 and 37, respectively. These shoulders on the cam are so arranged, or, in other words, bear such relation to the edges 33 and 34 upon the yoke, that when the valve 18 is turned for opening one or the other of the outlet ports 8 or 9, one or the other of the shoulders will strike an edge of the yoke thereby raising it and through the stem 15 opening the inlet valve. Thus as shown in the drawings, when the valve 18 is turned for opening the port 8 the shoulder 37 on the cam will engage the edge 34 on the yoke, lifting it and opening the inlet valve, or when the valve 18 is turned in the reverse direction for opening the port 9 the shoulder 36 on the cam will engage the edge 33 on the yoke lifting it and opening the inlet valve.

In the operation of the device the valves are opened simply by turning the operating handle 25 in one direction or the other when pressure will be admitted to pass by the inlet valve through the inlet passage into and through the chamber of the valve and thence be directed to one or the other of the outlet passages, depending upon the turned position of the outlet valve for opening one or the other of the outlet ports 8 or 9. Thus the construction is especially adaptable for a three-way valve. It is equally adaptable, however, for a two-way valve as shown in Fig. 4, the construction and operation being precisely the same as before described excepting that one of the outlet ports, for example, the outlet port 8 and the passage leading from it have been eliminated and in place thereof the side 40 of the valve body is closed, thus leaving but one outlet port, or the port 9, to be controlled by the outlet valve.

When the valves are opened by the opening of the outlet valve their open positions will be maintained. The outlet valve will be held in its open position by the fluid pressure within it which operates to press the shell of the valve hard against the socket within which it is contained and accordingly the valve will maintain its open position by the frictional resistance between it and the casing or body within which it is contained. On the other hand, when the inlet valve is open the entering fluid pressure will operate to close it although the pressure is passing all around the valve and tending to maintain it in a state of substantial balance. The inlet valve would nevertheless close were it not for the fact that the valve is maintained in its open position by the bearing of one or the other of the shoulders 36 or 37 on the cam 35 which is fixed to the outlet valve, the shoulders 36 or 37 then engaging with one or the other of the edges 33 or 34 upon the yoke on the end of the stem to the inlet valve. Inasmuch as the outlet valve is maintained in stationary open position by the pressure, the bearing of the shoulders 36 or 37 being maintained, will accordingly through the connections just referred to, operate to hold the inlet valve in an open position, overcoming, in other words, the tendency of the pressure to overbalance and close this valve.

In the closing of the valves the closure of the outlet valve is effected simply by a reverse turning of the operating handle 25, the force exerted by the handle when turned overcoming the frictional resistance between the outlet valve and its socket. When the outlet valve is thus manually closed there is no manual closing of the inlet valve. In other words, the inlet valve still has permitted opening when the outlet valve is closed. The inlet valve is closed, however, when the outlet valve is closed, by the fluid pressure, for when the outlet valve is closed one or the other of the shoulders 36 or 37 on the outlet valve which are then operating to hold the inlet valve in an open position, will be drawn away and will no longer offer their support or bearing to maintain the inlet valve in an open position, and the inlet valve being then unsupported will be moved by the fluid pressure to a closed position against its valve seat. Such closure will not be a violent closure for the reason that the valve as long as it is open is substantially balanced on its opposite sides by the fluid pressure but with a tendency to become closed by the pressure as before described. Accordingly when the inlet valve is no longer supported it will become gently closed by the pressure.

In case some obstruction prevent a proper closing of the inlet valve no harm will ensue. The inlet valve will simply close to a point of closure permitted by the obstruction and no harm will ensue inasmuch as the pressure has been cut off by the outlet valve and accordingly can do no harm to the inlet valve or its valve seat even though the inlet valve be slightly open.

When the inlet valve is first opened by the turning of the outlet valve for opening it, the inlet valve will open rapidly for preventing the fluid pressure cutting its valve seat as it might otherwise do if the inlet valve was slowly opened. The rapid opening of the inlet valve is because the shoulders 36 or 37, which effect the opening of the inlet valve, will have bearing for opening this valve at substantially right angles to its stem, and inasmuch as the shoulders are moved in a rotary direction they will accordingly lift the inlet valve most speedily at the beginning of their lifting operation, or in other words, when they are exerting a lifting force at substantially right angles to the stem of the inlet valve.

Having thus fully described my invention, I claim and desire to secure by Letters Patent of the United States:

1. A valvular device comprising a chambered body having an inlet and an outlet, a reciprocating valve for controlling the inlet and arranged to be closed by the fluid pressure admitted to the inlet, said reciprocating valve being provided with a valve stem extending inside the chamber of said body, said stem of the reciprocating valve being provided with a shoulder on the end thereof within the chamber of said body, a rotary valve inside said body for controlling the outlet as said rotary valve is turned, means for operating the rotary valve for opening and closing it from outside the chambered body, a member borne by the rotary valve axially arranged, means whereby the stem of the reciprocating valve is loosely connected to said axial member to permit of the reciprocating valve occupying an open position when the rotary valve is closed, and means movable with the rotary valve adapted and arranged to have bearing engagement with said shoulder on the stem of the reciprocating valve for opening the reciprocating valve when the rotary valve is opened, and for maintaining the reciprocating valve in an open position when the rotary valve is maintained in open position, and to draw away from said shoulder when the rotary valve is closed, whereby the reciprocating valve may be closed by the fluid pressure.

2. A valvular device comprising a chambered body having an inlet and an outlet, a reciprocating valve for controlling the inlet arranged to be closed by the fluid pressure admitted to the inlet, said reciprocating valve being provided with a valve stem extending inside the chamber of said body, said stem of the reciprocating valve being provided with a shoulder on the end thereof within the chamber of said body, means whereby the reciprocating valve and its stem are centered and the reciprocating valve guided during the opening and closure thereof, a rotary valve inside said body for controlling the outlet as said rotary valve is turned, means for operating the rotary valve for opening and closing it from outside the chambered body, a member borne by the rotary valve axially arranged, a yoke on the stem of the reciprocating valve loosely embracing said axial member whereby said member and stem of the reciprocating valve are loosely connected permitting of the reciprocating valve occupying an open position when the rotary valve is closed, and a cam carried by the rotary valve adapted and arranged to have engagement with the shoulder on the stem of the reciprocating valve for opening the reciprocating valve when the rotary valve is opened, and for maintaining the reciprocating valve in an open position when the rotary valve is maintained in open position, and to draw away from said shoulder when the rotary valve is closed whereby the reciprocating valve may be closed by the fluid pressure.

ARTHUR L. BRIDGHAM.